W. LEAS.
APPARATUS FOR RAISING DOUGH.
No. 51,949. Patented Jan. 9, 1866.
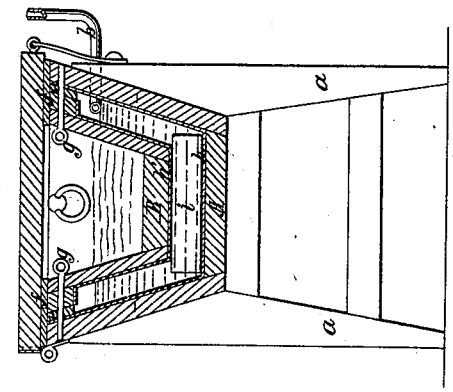
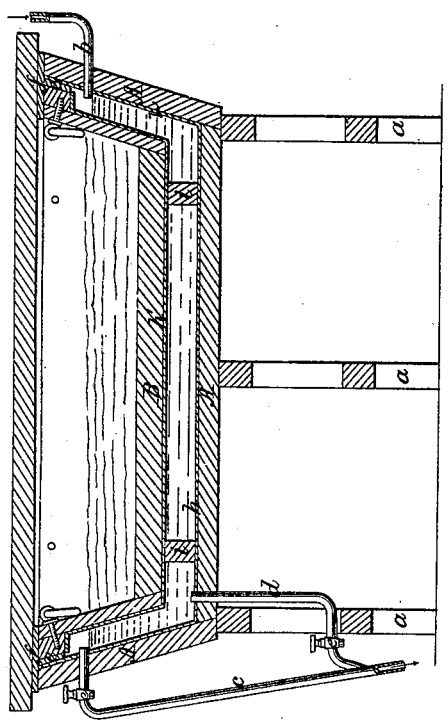

UNITED STATES PATENT OFFICE.

WORLEY LEAS, OF KOKOMO, INDIANA.

IMPROVED APPARATUS FOR RAISING DOUGH.

Specification forming part of Letters Patent No. 51,949, dated January 9, 1866.

*To all whom it may concern:*

Be it known that I, WORLEY LEAS, of Kokomo, in the county of Howard and State of Indiana, have invented a new and Improved Apparatus for Raising Dough; and I do hereby declare that the following is a full, clear, and exact description thereof, which will enable others skilled in the art to make and use the same, reference being had to the accompanying drawings, forming part of this specification, in which—

Figure 1 is a longitudinal vertical section. Fig. 2 is a transverse vertical section.

Similar letters of reference indicate like parts.

The object of my invention is to produce an apparatus, intended particularly for bakers' use, for raising dough in a quicker and better manner than heretofore; and it consists in the construction of a box containing a tray for holding dough, and capable of receiving under such tray hot water or steam, for imparting sufficient heat to cause the dough to rise in a thorough and expeditious manner.

To enable others to understand my invention, I will proceed to describe it.

A represents the box, which I term a "steam" or "hot-water" chest. It is made of metal or wood, or both combined, in any desirable shape, and mounted on legs $a\ a\ a$. In the present instance the disk A is made of wood and lined with tin $h$.

B is the dough-tray, made of metal or wood, or both combined. In the present instance it is made of wood and covered on the outside with tin $h'$. This tray is fitted to set into the chest A, and its depth is proportioned to the depth of the chest, it being necessary that a sufficient space be left below it to admit of the introduction of heated water or steam, either of which may be let into the chest in any suitable way. I have shown a pipe, $b$, for an induction-pipe of steam or heated water and two eduction or waste pipes, $c\ d$, for steam or water, respectively, each pipe being provided with a cock or cocks, $e$, for closing them in the usual way.

It is necessary that the dough-tray be fitted into the chest A sufficiently tight to prevent the steam or vapor passing or leaking through the crack so as to come in contact with the dough; and to insure this I interpose a layer or layers of any suitable substance, $e$, for a packing—such as india-rubber, for instance—all around or wherever necessary between the tray and the sides of the chest. This will, under any circumstance, prevent the escape of any steam or vapor. As a further security, I attach around the cover or lid C, so that the same will, when the the lid is closed, rest over the cracks or points of contact between the tray and chest, strips of rubber or any suitable substance, $f$. This insures a perfectly tight joint.

To prevent the water or steam from raising or throwing up the tray, should the pressure of the steam or the quantity of the water be sufficient to cause this, I use pins $g$ for securing the tray in the chest; and I design using blocks $i$, or some equivalent device, under the tray for a solid or strong base on which to rest it.

In using the apparatus I put (for bread) the desired quantity of flour into the tray and the yeast and the water, &c., and mix the whole together in the usual manner. The lid is then closed and the steam or hot water, as the case may be, of the proper temperature, is admitted to the chest through the pipes provided for the purpose. When sufficient has entered the chest to fill the space below the dough-tray the cocks are shut off and the apparatus is left at rest. I have found by experiment that dough can be raised in one-third less time by my apparatus than in the way now practiced.

What I claim as new, and desire to secure by Letters Patent, is—

The combination of the dough-tray B and the steam or water chest A, substantially as and for the purpose described.

WORLEY LEAS.

Witnesses:
THOMAS MILLIKAN,
ALFRED NORTON.